United States Patent
Loubeyre

(10) Patent No.: US 7,595,606 B2
(45) Date of Patent: Sep. 29, 2009

(54) ELECTRICALLY POWERED OR HYBRID VEHICLE COMPRISING A BATTERY CHARGING CONTROL DEVICE WITH INTERRUPTION OF ELECTRICAL MOTOR-BATTERY CONNECTION DURING CHARGE

(75) Inventor: Yves Loubeyre, Garches (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 384 days.

(21) Appl. No.: 10/536,702

(22) PCT Filed: Oct. 3, 2003

(86) PCT No.: PCT/FR03/50079

§ 371 (c)(1),
(2), (4) Date: Oct. 25, 2005

(87) PCT Pub. No.: WO2004/050411

PCT Pub. Date: Jun. 17, 2004

(65) Prior Publication Data

US 2006/0132085 A1    Jun. 22, 2006

(30) Foreign Application Priority Data

Nov. 27, 2002  (FR)  ................................ 02 14853

(51) Int. Cl.
*H01M 10/46* (2006.01)
(52) U.S. Cl. .................................................... 320/104
(58) Field of Classification Search .............. 320/104, 320/108, 109, 115
See application file for complete search history.

(56) References Cited

U.S. PATENT DOCUMENTS

| | | | |
|---|---|---|---|
| 5,341,075 A | 8/1994 | Cocconi | |
| 5,581,171 A * | 12/1996 | Kerfoot et al. | 320/137 |
| 5,656,915 A * | 8/1997 | Eaves | 320/118 |
| 5,905,371 A * | 5/1999 | Limpaecher | 320/166 |
| 6,614,204 B2 * | 9/2003 | Pellegrino et al. | 320/109 |
| 6,792,259 B1 * | 9/2004 | Parise | 455/343.1 |

FOREIGN PATENT DOCUMENTS

| | | |
|---|---|---|
| DE | 43 24 010 A1 | 1/1995 |
| EP | 0 224 144 A1 | 6/1987 |
| EP | 0 566 320 A2 | 10/1993 |
| EP | 0834977 A2 | 4/1997 |
| EP | 1 201 485 A1 | 5/2002 |

OTHER PUBLICATIONS

"Citroen Xsara Dynactive . . . " Revue Technique Automobile, vol. 55, No. 632, Oct. 2000, pp. 44-45.

(Continued)

*Primary Examiner*—Edward Tso
(74) *Attorney, Agent, or Firm*—Nicolas E. Seckel

(57) ABSTRACT

A vehicle comprising an electric motor serving as a powering engine and a storage battery for running the electric motor. The vehicle comprises a battery charger coupled to an electric power source external to the vehicle with power for rapid charge, for example, on the order of magnitude of ten minutes. The battery charger is, for example, designed to enable a charge via a three-phase power supply network.

12 Claims, 3 Drawing Sheets

OTHER PUBLICATIONS

Badin et al., "Hybrid Vehicles . . . ", The 18th International Electric Vehicles Symposium, Online!, Oct. 21-24, 2001, Berlin, Germany.

Citroen Xsara Dynactive: A Nouveau Siecle, Nouvelle Technologie, Revue Technique Automobile, etai, Boulogne-Billancourt, FR, vol. 55, No. 632, Oct. 2000, pp. 44-45.

F. Badin, B. Jeanneret, R. Trigui, F. Harel: Hybrid Vehicles, should we plug them to the grid or not?, The 18th Int'l Electric Vehicles Symposium, Online!, Oct. 21-24, 2001, Berlin, DE, <URL:www.inrets.fr/ur/lte/publications/publications-pdf/Veh2-publi/BADIN-EVS18.pdf>.

Int'l Search Report for PCT/FR03/50079, dated Mar. 6, 2004.

* cited by examiner

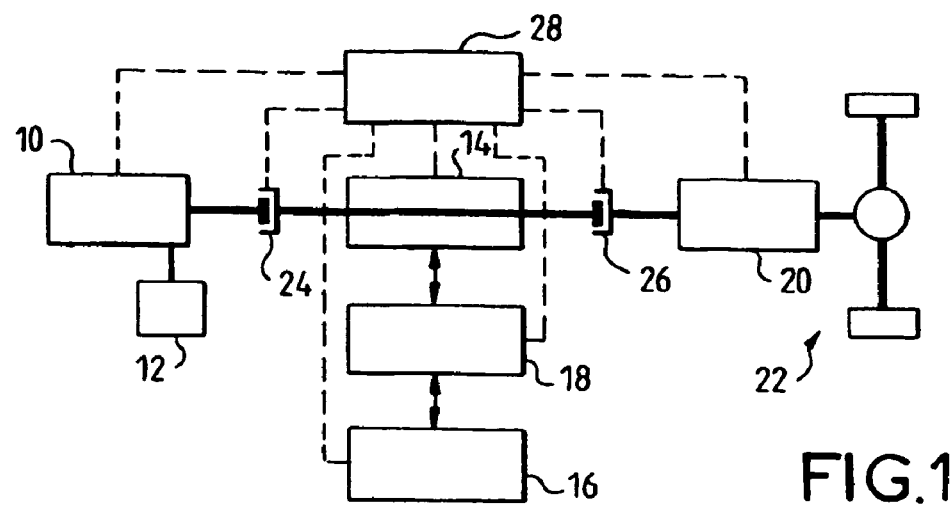
FIG.1
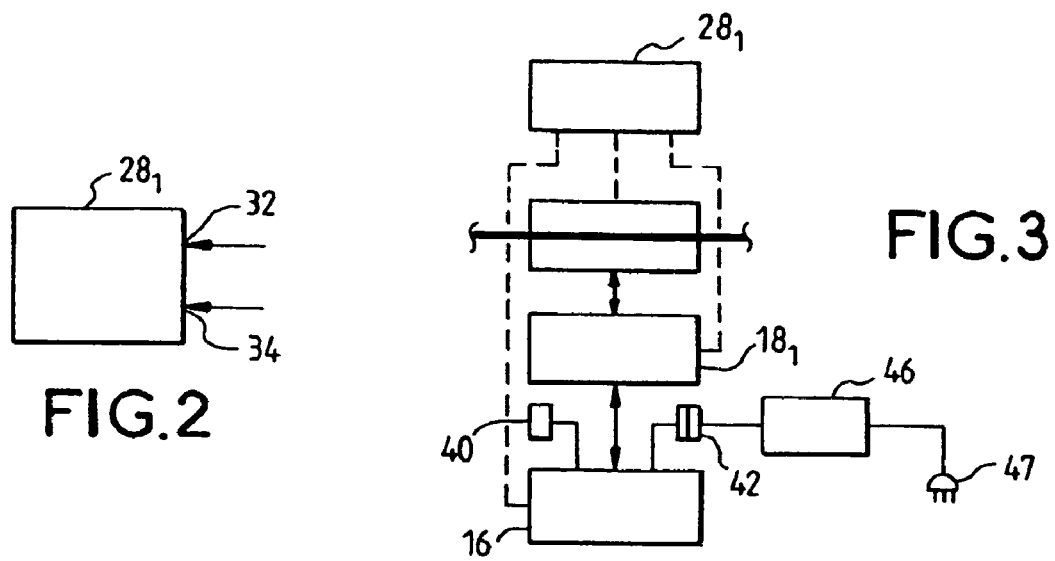
FIG.2
FIG.3
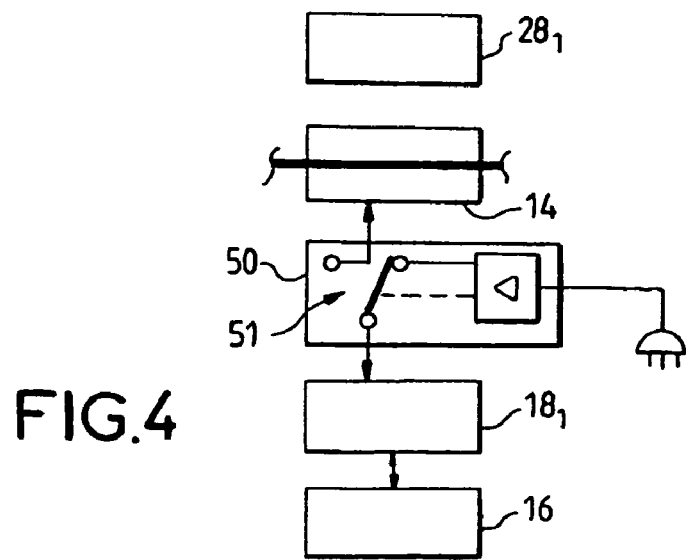
FIG.4

ELECTRICALLY POWERED OR HYBRID VEHICLE COMPRISING A BATTERY CHARGING CONTROL DEVICE WITH INTERRUPTION OF ELECTRICAL MOTOR-BATTERY CONNECTION DURING CHARGE

FIELD OF THE INVENTION

The present invention pertains to an electrically powered or hybrid motor vehicle.

BACKGROUND

Electrically powered motor vehicles are known to be used for short distances only because of the limited capacity of the batteries and the time needed to charge a battery.

SUMMARY OF THE INVENTION

The present invention makes it possible to use an electrically powered motor vehicle over long distances.

The electrically powered vehicle according to the present invention is characterized in that it comprises means for charging the battery by means of an electric power source external to the vehicle which has a power permitting rapid charge, for example, on the order of magnitude of ten minutes.

The electric power sources external to the vehicle may be installed in "service stations" at which fuel is available for vehicles equipped with internal combustion engines or for hybrid vehicles. The duration of charging may be on the same order of magnitude as the time during which a vehicle with internal combustion engine is stopped at the gas station to fill up the tank with fuel.

The present invention is useful not only for purely electrically powered vehicles but also in the case of hybrid vehicles in which the user can freely select the powering mode. In fact, the user may prefer electric power in certain cases, especially for urban traffic or other zones in which the exhaust gases may be harmful, and the user has means for charging the battery in these situations without having to operate the internal combustion engine.

It is recalled here that a hybrid vehicle comprises, on the one hand, a conventional internal combustion engine and, on the other hand, an electric motor supplied by a storage battery. The battery is charged when the vehicle is being powered by the internal combustion engine. The internal combustion engine drives the electric motor in this case, which operates now as a generator and charges the battery.

Such a vehicle comprises a means for automatic power management, which gives priority to the electric power when the battery is sufficiently charged and to the internal combustion engine above a certain rate of speed. By contrast, when the state of charge of the battery is not sufficient, the internal combustion engine is systematically put into operation partly to ensure the powering and partly to charge the battery.

It shall also be recalled that a power mode management for hybrid vehicles has already been provided, which comprises a switching means that can be actuated by the driver, which enables him to choose between an automatic management mode and a manual management mode offering the choice between the mode of powering by means of the internal combustion engine and the mode of powering by means of the electric motor.

It is the presence of such a switching means that enables the driver to give preference to the electric power.

Given that the electric power supply network, e.g., a 380-V three-phase network, of a power sufficient to achieve rapid charging of the battery of the electric or hybrid vehicle, is not necessarily available everywhere, a preferred embodiment of the vehicle also comprises means that make it possible to carry out the charging with a second power, which is appreciably lower than the first one. Thus, the charging may be carried out at home during a period of time on the order of magnitude of an hour in case of a hybrid vehicle.

These charging means are such, for example, that they permit charging from a single-phase network, e.g., one with a voltage of 220 V.

In one embodiment, the electric or hybrid vehicle is such that the means for charging the battery by means of an external power source comprise filtering means for isolating the power source from electromagnetic interferences generated onboard the vehicle.

The means for charging the battery by means of the external power source may comprise means for balancing the phases of the power source.

According to one embodiment, the vehicle comprises a switch having a first position, in which the electric machine is connected to power supply from the battery, and a second position, in which the battery is connected to an external charging source, the connection between the motor and the battery being interrupted, the switch being made integrally in one piece with an electric socket located in the vehicle and intended to cooperate with a complementary socket of a network, the switch automatically assuming the second position when the electric socket of the vehicle cooperates with the complementary socket of the network.

In case of a hybrid vehicle, provisions are made in one embodiment for the means for charging the battery to comprise a means acting as a rectifier for charging and acting as an inverter when the machine is operating as a motor supplied from the battery.

A hybrid vehicle comprises, for example, an automatically operating, two-position switch having a first position in which the electric machine is connected to battery supply and a second position in which the battery is connected with an external charging power source, the connection between the motor and the battery now being interrupted.

In case of a hybrid vehicle comprising a control device with a calculation means for automatically determining the mode of power, with internal combustion engine and/or electric motor, as a function of the state of charge of the battery and the torque the vehicle is required to deliver, this control device comprises an additional control means that can be actuated inside the vehicle in order to make it possible to freely select the mode of power, the additional control means being connected, for example, to the calculation means.

BRIEF DESCRIPTION OF THE DRAWINGS

Other features and advantages of the present invention will appear from the description of some of its embodiments, the description being given in reference to the attached drawings, in which:

FIG. 1 shows a schematic diagram of a prior-art hybrid vehicle;

FIG. 2 shows a schematic view showing the control means of a hybrid vehicle;

FIG. 3 shows a schematic view of an embodiment of the present invention;

FIG. 4 shows a schematic view analogous to that in FIG. 3, but for a variant;

DETAILED DESCRIPTION

Figure 5:
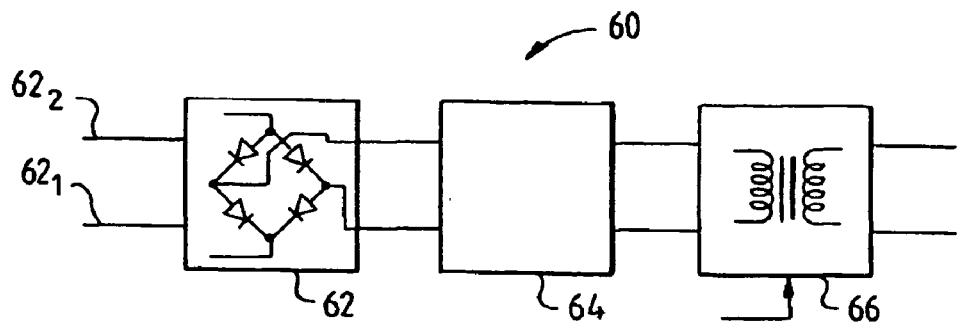
FIG. 5 shows a schematic view of a charging circuit for an embodiment variant shown in FIG. 3.

FIG. 1 shows the principle of a prior-art hybrid vehicle to which the present invention applies.

Such a hybrid vehicle comprises a conventional internal combustion engine 10 with a fuel tank 12. The internal combustion engine 10 is connected with an electric machine 14 forming the electric drive motor of the vehicle, on the one hand, and a generator for charging the battery, on the other hand.

The electric machine 14 is connected with a battery 16 via the intermediary of an electronic power circuit 18 that makes possible, on the one hand, the transfer of energy from the battery 16 to the machine 14 operating a motor, and, on the other hand, inversely, the charging of the battery when the machine 14 operates as a generator.

The shaft of the electric machine may be connected directly with the shaft of the internal combustion engine and the shaft of the electric machine 14 (or the shaft of the internal combustion engine) may be connected directly with a transmission 20 for driving the wheels 22, the transmission being able to be, for example, a manual or automatic gearbox.

It is also possible to provide clutches 24 and 26 for coupling the shaft of the internal combustion engine with the shaft of the electric motor and for uncoupling the shaft of the electric motor from the transmission shaft.

For example, the shaft of the internal combustion engine is coupled with the shaft of the electric motor in the electric power mode when the accessories such as the air conditioner of the vehicle are powered by the internal combustion engine. In the case in which a clutch 24 is provided, the shaft of the electric motor can be uncoupled from the shaft of the internal combustion engine when the battery has a low charge or at the start of the vehicle when it is powered by the internal combustion engine or the electric motor.

To control all these elements, calculation means 28 comprising one or more calculators are provided.

Thus, these calculation means 28 control the internal combustion engine 10, the electric machine 14, the circuit 18, the clutches 24 and 26 as well as the transmission 20. These calculation means are also connected to the battery 16 to receive signals of the latter, such as the depth of discharge or its temperature.

The calculation means make it possible, in particular, to manage the mode of power such that the vehicle will be powered by electric power when the battery is sufficiently charged and by the internal combustion engine 10 when the charge of the battery becomes insufficient and to charge the battery in this case.

For driving at a high rate of speed, the calculation means gives priority to powering by the internal combustion engine, but the electric motor may intervene if needed, especially during the phase of acceleration to provide additional torque.

Provisions are made in the present invention for the calculation means $28_1$ (FIG. 2) to be programmed in such a way as to make it possible to deactivate the automatic powering mode management as desired, the driver being now able to choose preferentially either the electric power or powering by means of the internal combustion engine. Thus, the driver has two control buttons (not shown), one for controlling the vehicle in case of electric power only and the other for controlling the vehicle only in the case in which it is powered by the internal combustion engine.

These two buttons send pulses to the respective inputs 32 and 34 of the calculation means $28_1$. A pulse on the entry 32 corresponds to powering by the electric motor only, and a pulse at the input 34 corresponds to powering by the internal combustion engine only.

According to a second aspect of the present invention, which can be used independently from the first aspect or in combination with the latter, provisions are made, in the hybrid vehicle, for means permitting the battery to be charged with electricity from an external power network.

Provisions are made, for example, for means permitting the battery to be charged either by means of a three-phase network with a voltage of 380 V or by means of a single-phase network with a voltage of 220 V.

In the example shown in FIG. 3, the hybrid vehicle comprises connectors 40 and 42 connected to the battery and making it possible to cooperate with external recharging means. Thus, the connector 40 is intended to cooperate with a complementary connector of the external high-power charging means, for example, one located at a service station for recharging with 380-V three-phase current, whereas the connector 42 is intended to be connected, via the intermediary of a simple power outlet 47, with external recharging means 46 supplied with conventional two-phase or single-phase current with a voltage of 220 V.

In the example shown in FIG. 4, the very-high-power or rapid charge takes place via the intermediary of the circuit 18, onboard the hybrid vehicle, at the input of which a switch assembly unit 50 is provided, likewise onboard the vehicle, which is also connected with the machine 14.

With the circuit $18_1$, the assembly unit 50 permits high-power charging. It is of the single-phase or three-phase type and ensures, on the one hand, the isolation between the circuit 18 and the machine 14 and, on the other hand, by filtering, the protection of the supply network from the electromagnetic interferences that could originate from the vehicle. The assembly unit 50 also permits the phase balance of the network to be maintained.

In a variant, the assembly unit 50 is located, at least partly, outside the vehicle, for example, in an energy distribution station.

In this embodiment, the slow recharging circuit 60 comprises, on the one hand, a diode bridge rectifier 62 for converting into DC voltage the 220-V single-phase voltage with 15 A applied to the inputs $62_1$ and $62_2$ of the rectifier 62. The output of the rectifier 62 is connected to the inputs of a filtering and power "boosting" circuit 64, the "boosting" function permitting a correction of the power factor, i.e., a modulation of the current as a function of the voltage present in the network.

In this embodiment, the slow recharging circuit 60 comprises, on the one hand, a diode bridge rectifier 62 for converting into DC voltage the 220-V single-phase voltage with 15 A applied to the input 62. The output of the rectifier 62 is connected to the inputs $62_1$ and $62_2$ of a filtering and power "boosting" circuit 64, the "boosting" function permitting a correction of the power factor, i.e., a modulation of the current as a function of the voltage present in the network.

This circuit 64 is connected with the input of the circuit 66 which modulates the charging current and ensures the galvanic isolation, the circuit 66 being connected to the terminals of the battery to be charged. The circuit 66 also comprises conventional means of regulating the charging current, which are controlled by the calculation means (not shown in FIG. 5).

Figure 6:
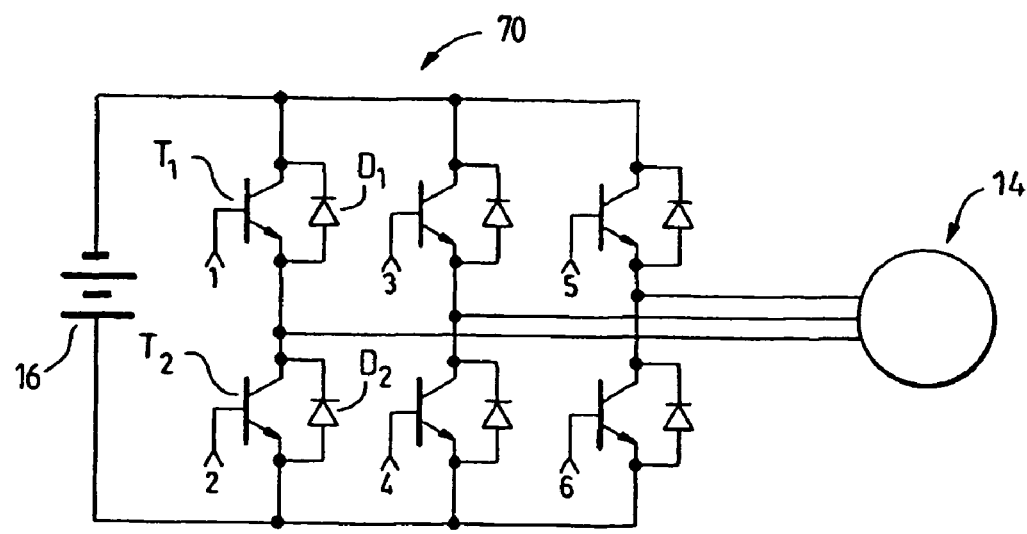
FIG. 6 shows a schematic view of an inverter for a hybrid vehicle.
Figure 6:
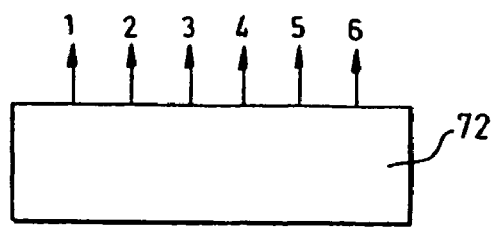

In the embodiment shown in FIG. 6, the machine 14 is of the three-phase type. Thus, the battery 16 is connected with the motor via the intermediary of an inverter 70 comprising, in the example, six pairs of transistors $T_1$ and diodes $D_1$, the base of each transistor being controlled by an electronic unit 72 that is part of the calculation means. The transistors are controlled such that when the vehicle is being powered electrically or in the mixed mode, the current supplied by the battery is transformed into an alternating three-phase current with which the motor 14 is supplied, and when the machine 14 is operating as a generator for charging the battery 16, the transistors $T_1$ and the diodes $D_1$ form a rectifying bridge to deliver a direct charging current to the battery.

Figure 7:
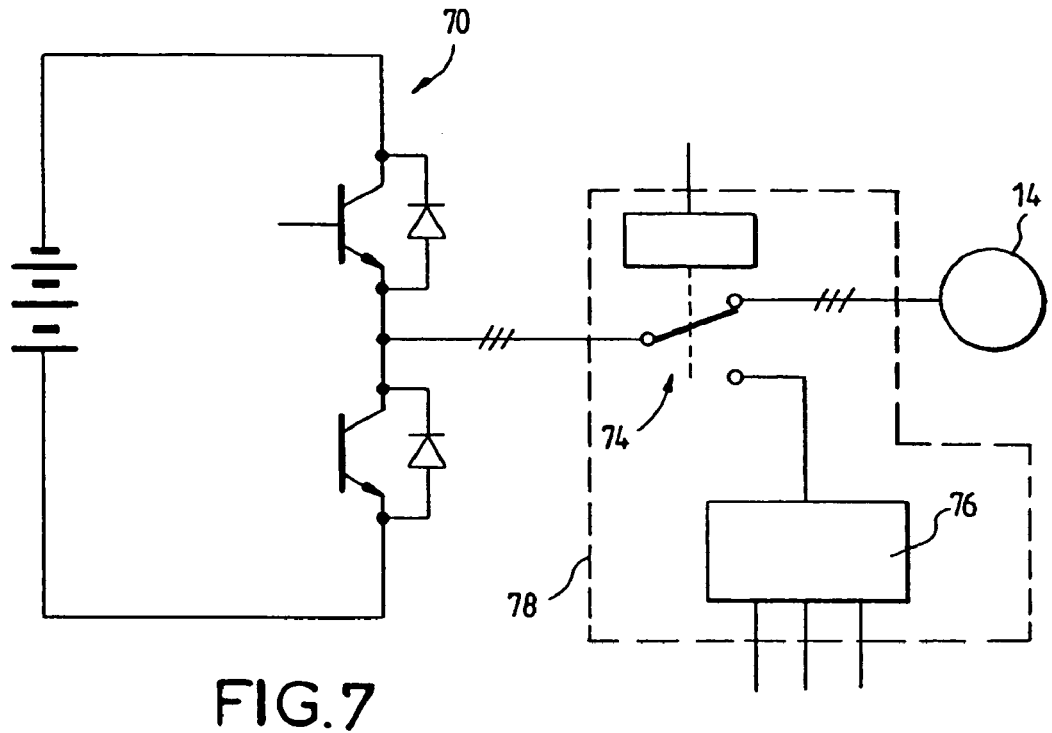
FIG. 7 shows a schematic view corresponding to the example according to FIG. 4.

FIG. 7 shows a schematic view of an exemplary embodiment of the high-power three-phase supply for the rapid recharge of the type shown in FIG. 4 and involving the use of the inverter 70 shown in FIG. 6. The switch 74 and the filter 76 protecting the external three-phase supply network from the electromagnetic interferences generated onboard the vehicle are located in an assembly unit 78 integrated within the vehicle.

The switch 74 is controlled automatically by the calculation means. Thus, in the position of the switch as shown in FIG. 7, the machine 14 is connected to the battery supply and to the transistor and diode assembly when the contact key of the vehicle is in the drive position. When the contact key is in the stop position, the switch 74 is in the other position, ready for recharging.

Figure 8:
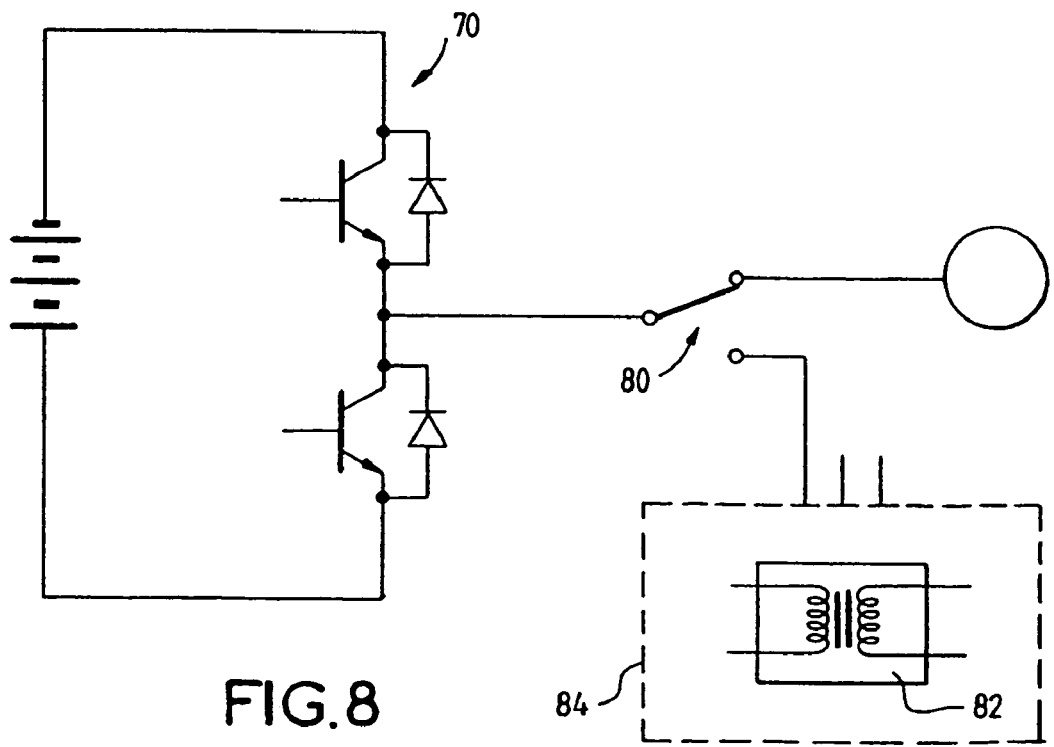
FIG. 8 shows a schematic view corresponding to a variant of the example shown in FIG. 7.

In the example shown in FIG. 8, the switch 80 is controlled mechanically. It is, for example, in the electric outlet of the vehicle and is brought into the charging position (and consequently into the position in which it is disconnected from the motor) when the plug of the network cooperates with the socket of the vehicle. In addition, the filtering circuit 82 is not onboard the vehicle but at an electricity distribution station indicated by the box 84.

The present invention is not, of course, limited to the embodiments described. In particular, it is not limited to hybrid vehicles. It may also be used for electrically powered vehicles.

The invention claimed is:

1. A vehicle comprising an electric motor having an engine powering function and a storage battery for running the electric motor, comprising means for charging the battery from an electric power source external to the vehicle with a power permitting rapid charge, further comprising a switch having a first position, in which the electric motor is connected to the battery and a second position in which the battery is connected with the external power source via a connector of the vehicle adapted to cooperate with a complementary connector of the external power source, the connection between the motor and the battery being interrupted when the switch is in the second position, wherein the electric motor is of the three phase type, wherein the means for charging the battery are arranged such as to permit charging via a three-phase supply network, wherein the means for charging the battery comprise a means acting as a rectifier for the charging of the battery from the electric motor and operating as an inverter when the electric motor is supplied by the battery when the switch is in the first position, and wherein the means acting as a rectifier and operating as an inverter is disposed between the battery and the switch, so as to act as a rectifier to charge the battery from the external power source when the switch is in the second position in which the battery is connected with the external power source.

2. A vehicle in accordance with claim 1, further comprising means for charging the battery with a second power source that is substantially lower than the external power source permitting rapid change.

3. A vehicle in accordance with claim 2, wherein the means for charging with the second power source are such as to permit charging via a single-phase supply network.

4. A vehicle in accordance with claim 1, wherein the means for charging the battery by means of the external power source comprise filtering means for isolating the external power source from electromagnetic interferences generated onboard the vehicle.

5. A vehicle in accordance with claim 1, wherein the means for charging the battery by means of the external power source comprise means for balancing phases of a multi-phase supply network.

6. A vehicle in accordance with claim 1, wherein the switch is an integral part of an electric outlet located in the vehicle and being configured to cooperate with a complementary outlet of a network, the switch automatically assuming the second position when the electric outlet of the vehicle is cooperating with the complementary outlet of the network.

7. A vehicle in accordance with claim 1, wherein the vehicle is of the hybrid type and comprises an internal combustion engine, the electric motor being configured to be of an electric power generator for supplying a charging current for the storage battery when it is operating as a generator, a control device with a calculation means being provided for automatically determining a mode of powering, with internal combustion engine and/or with electric motor, depending on a state of charge of the battery and a required torque of the vehicle.

8. A vehicle in accordance with claim 7 wherein the switch is a two-position automatic switch having a first position in which the electric motor is connected to the battery and a second position in which the battery is connected with the external charging power source, the connection between the motor and the battery being interrupted when the battery is connected to the external charging power source.

9. A vehicle in accordance with claim 7, wherein the control device comprises an additional control means that is configured to be actuated from inside the vehicle in order to allow free selection of the mode of powering.

10. A vehicle in accordance with claim 9, wherein the additional control means is connected to the calculation means.

11. A vehicle in accordance with claim 4, wherein the filtering circuit is integrated within the vehicle and located between the switch and the connector.

12. A vehicle in accordance with claim 4, wherein the filtering circuit is not onboard the vehicle and is located between the external power source and the complementary connector of the external power source.

* * * * *